United States Patent
Rutter et al.

(10) Patent No.: US 11,488,156 B2
(45) Date of Patent: Nov. 1, 2022

(54) CONFIDENTIAL ASSET TRANSACTION SYSTEM

(71) Applicant: LedgerEdge Ltd, London (GB)

(72) Inventors: David E. Rutter, London (GB); David M. Nicol, London (GB); Kevin Walter Rutter, London (GB)

(73) Assignee: LedgerEdge Ltd., London (GB)

( * ) Notice: Subject to any disclaimer, the term of this patent is extended or adjusted under 35 U.S.C. 154(b) by 0 days.

(21) Appl. No.: 17/328,899

(22) Filed: May 24, 2021

(65) Prior Publication Data

US 2022/0012725 A1 Jan. 13, 2022

Related U.S. Application Data

(60) Provisional application No. 63/051,134, filed on Jul. 13, 2020, provisional application No. 63/090,686, filed on Oct. 12, 2020.

(51) Int. Cl.
| | |
|---|---|
| *G06Q 20/38* | (2012.01) |
| *G06F 16/22* | (2019.01) |
| *G06F 21/60* | (2013.01) |
| *G06Q 20/06* | (2012.01) |
| *G06Q 40/04* | (2012.01) |

(Continued)

(52) U.S. Cl.
CPC ....... *G06Q 20/383* (2013.01); *G06F 16/2272* (2019.01); *G06F 21/602* (2013.01); *G06Q 20/0655* (2013.01); *G06Q 20/389* (2013.01); *G06Q 20/3829* (2013.01);

(Continued)

(58) Field of Classification Search
CPC ............................ G06Q 20/283; G06Q 40/04
See application file for complete search history.

(56) References Cited

U.S. PATENT DOCUMENTS

| | | | |
|---|---|---|---|
| 5,077,665 A | 12/1991 | Silverman et al. | |
| 5,375,055 A | 12/1994 | Togher et al. | |

(Continued)

FOREIGN PATENT DOCUMENTS

| | | |
|---|---|---|
| GB | 2426602 A | 11/2006 |
| WO | 2019150132 A1 | 8/2019 |

OTHER PUBLICATIONS

Benndorf, V., in "Voluntary Disclosure of Private Information and Unraveling in the Market for Lemons: An Experiment," in Games (Year: 2018).*

(Continued)

*Primary Examiner* — Mike Anderson
*Assistant Examiner* — Brandon M Duck
(74) *Attorney, Agent, or Firm* — Perkins Coie LLP

(57) ABSTRACT

A system is provided for controlling privacy in an exchange of an asset. The system receives an offer query of an offeror that includes an offeror reveal condition, an asset identifier of the asset, and offeror terms of exchange. The system accesses an offeree reveal condition and offeree terms of exchange for the asset. The system determines whether the offeror reveal condition and the offeree reveal condition are satisfied and determines whether the offeror terms of exchange and the offeree terms of exchange are satisfied. When the offeror reveal condition, the offeree reveal condition, the offeror terms of exchange, and the offeree terms of exchange are satisfied, the system reveals the offeror to the offeree and the offeree to the offeror.

25 Claims, 8 Drawing Sheets

(51) Int. Cl.
*H04L 9/06* (2006.01)
*H04L 9/00* (2022.01)

(52) U.S. Cl.
CPC .......... *G06Q 40/04* (2013.01); *H04L 9/0618* (2013.01); *H04L 9/50* (2022.05); *H04L 2209/56* (2013.01)

(56) References Cited

U.S. PATENT DOCUMENTS

| | | | |
|---|---|---|---|
| 5,924,083 | A | 7/1999 | Silverman et al. |
| 7,475,046 | B1 | 1/2009 | Foley et al. |
| 7,496,531 | B1 | 2/2009 | Gastineau et al. |
| 9,754,444 | B2 * | 9/2017 | Lutnick ............. G06Q 30/0209 |
| 10,269,068 | B1 | 4/2019 | Neff et al. |
| 10,552,829 | B2 | 2/2020 | Wilkins et al. |
| 11,080,665 | B1 * | 8/2021 | Poelstra ............. G06Q 20/0658 |
| 2002/0062322 | A1 * | 5/2002 | Genghini ............. G06Q 30/06 715/234 |
| 2003/0120585 | A1 | 6/2003 | Rosenblatt |
| 2004/0019554 | A1 | 1/2004 | Merold et al. |
| 2004/0058731 | A1 * | 3/2004 | Rossides ................ G06Q 50/34 463/42 |
| 2007/0043649 | A1 | 2/2007 | Howorka et al. |
| 2008/0046354 | A1 | 2/2008 | Olsson et al. |
| 2009/0063326 | A1 | 3/2009 | Matsushima |
| 2009/0254971 | A1 * | 10/2009 | Herz .................. G06Q 30/0603 726/1 |
| 2009/0281954 | A1 | 11/2009 | Waelbroeck et al. |
| 2010/0228661 | A1 | 9/2010 | Lutnick et al. |
| 2011/0119176 | A1 | 5/2011 | Hanson et al. |
| 2011/0276457 | A1 | 11/2011 | Neyman et al. |
| 2012/0296716 | A1 * | 11/2012 | Barbeau ................ G06Q 30/02 705/14.13 |
| 2015/0006408 | A1 * | 1/2015 | Mak ................... G06Q 30/0603 705/80 |
| 2016/0292672 | A1 | 10/2016 | Fay et al. |
| 2017/0270518 | A1 | 9/2017 | Kylänpää |
| 2018/0343114 | A1 | 11/2018 | Ben-ari |
| 2019/0026828 | A1 | 1/2019 | Preston et al. |
| 2019/0058696 | A1 | 2/2019 | Bowman et al. |
| 2019/0095910 | A1 | 3/2019 | Gumowski |
| 2019/0164153 | A1 * | 5/2019 | Agrawal ................ H04L 9/008 |
| 2019/0244290 | A1 | 8/2019 | Massacci et al. |
| 2019/0325044 | A1 | 10/2019 | Gray |
| 2019/0334715 | A1 | 10/2019 | Gray |
| 2020/0058023 | A1 | 2/2020 | Travizano et al. |
| 2020/0104854 | A1 | 4/2020 | Walden et al. |
| 2020/0184084 | A1 | 6/2020 | Shockley et al. |
| 2020/0334719 | A1 * | 10/2020 | Borchers ............ G06Q 20/0283 |
| 2021/0174441 | A1 | 6/2021 | Asharov et al. |
| 2021/0192538 | A1 | 6/2021 | Varvarian et al. |

OTHER PUBLICATIONS

Nakamoto, Satoshi, "Bitcoin: A Peer-to-Peer Electronic Cash System," http://www.bitcoin.org/bitcoin.pdf, pp. 1-9, Jul. 4, 2010.
Non-Final Office Action received in U.S. Appl. No. 17/328,937, dated Aug. 6, 2021.
Response to Non-Final Office Action submitted in U.S. Appl. No. 17/328,937, dated Nov. 8, 2021.
International Search Report and Written Opinion received in Application No. PCT/IB21/56263, dated Oct. 4, 2021, 11 pages.

* cited by examiner

CONFIDENTIAL ASSET TRANSACTION SYSTEM

CROSS-REFERENCE TO RELATED APPLICATION(S)

This application claims the benefit of priority to U.S. Provisional Patent Application No. 63/051,134 filed on Jul. 13, 2020, and U.S. Provisional Patent Application No. 63/090,686 filed on Oct. 12, 2020, the entire disclosure of each of these applications is incorporated herein by reference.

BACKGROUND

Distributed ledgers are currently being used in a wide variety of business applications. The bitcoin system is an example of a distributed ledger. The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner, as represented by the new owner public key. The signing by the owner of the bitcoin is an authorization by the owner to transfer ownership of the bitcoin to the new owner via the new transaction. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions fora bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UTXO") set because it tracks the output of all transactions that have not yet been spent.

Although the bitcoin system has been very successful, it is limited to transactions in bitcoins or other cryptocurrencies. Blockchains have been developed to support transactions of any type, such as those relating to the sale of vehicles, sale of financial derivatives, sale of stock, payments on contracts, and so on. Such transactions use identity tokens to uniquely identify something that can be owned or can own other things. An identity token for a physical or digital asset is generated using a cryptographic one-way hash of information that uniquely identifies the asset. Tokens also have an owner that uses an additional public/private keypair. The owner public key or hash of the owner public key is set as the token owner identity, and when performing actions against tokens, ownership proof is established by providing a signature generated by the owner private key and validated against the public key or hash of the public key listed as the owner of the token. A person can be uniquely identified, for example, using a combination of a user name, social security number, and biometric (e.g., fingerprint). The creation of an identity token for an asset in a blockchain establishes provenance of the asset, and the identity token can be used in transactions (e.g., purchasing, selling, or insuring) involving the asset stored in a blockchain, creating a full audit trail of the transactions.

To enable more complex transactions than bitcoin can support, some systems use "smart contracts." A smart contract is a decentralized computer program that comprises code and a state. A smart contract can perform virtually any type of processing such as sending money, accessing external databases and services (e.g., oracles), and so on. A smart contract may be executed in a secure platform (e.g., the Ethereum platform, which provides a virtual machine) that supports recording transactions in a blockchain. The smart contract code itself may be recorded as a transaction in the blockchain using an identity token that is a hash of the smart contract code so that it can be authenticated. When the smart contract deployed, a constructor of the smart contract executes, initializing the smart contract and its state. In Ethereum, a smart contract is associated with a contract account. There are two types of accounts in Ethereum: externally owned accounts ("EOA"), which are controlled by private keys, and contract accounts, which are controlled by computer code. Accounts contain the following fields: a balance, code (if present), and a storage (empty by default). The code of a smart contract is stored as the code in a contract account, and the state of the smart contract is stored in the contract account's storage, which the code can read from and write to. An EOA has no code and does not need a storage, so those two fields are empty in an EOA. Accounts have a state. The state of an EOA comprises only a balance, whereas the state of a contract account comprises both a balance and a storage. The states of all accounts are the state of the Ethereum network, which is updated with every block and about which the network needs to reach a consensus. An EOA can send transactions to other accounts by signing the transactions with the private key of the EOA account. A transaction is a signed data package that contains a message to be sent from an EOA to the recipient account identified in the transaction. Like an EOA, a contract account, under control of its code, can also send messages to other accounts. However, a contract account can send messages only in response to transactions that it has received. Therefore, all action in the Ethereum blockchain is triggered by transactions sent from EOAs. A message sent by a contract account differs from a transaction sent by an EOA in that a message sent by a contract account does not include a cryptographic signature since a contract account is not controlled by a private key. When a contract account receives a message, every mining node that maintains a replica of the blockchain executes the code of the contract account as part of the block validation process. So if a transaction is added into a block, all nodes that validate the block execute the code whose execution is triggered by that transaction. Although the execution of the computer code at each node helps ensure the authenticity of the blockchain, large amounts of computer resources are required to support such redundant execution of computer code.

Although blockchains can effectively store transactions, the large amount of computer resources, such as storage and computational power, needed to maintain all the replicas of the blockchain can be problematic. To overcome this problem, some systems for storing transactions do not use blockchains, but rather have each party to a transaction maintain its own copy of the transaction. One such system is the Corda system developed by R3, Ltd., which provides a decentralized distributed ledger platform in which each participant in the platform has a node (e.g., computer system) that maintains its portion of the distributed ledger. When parties agree on the terms of a transaction, a party submits the transaction to a notary, which is a trusted node, for notarization. The notary maintains a UTXO database of unspent transaction outputs. When a transaction is received, the notary checks the inputs to the transaction against the UTXO database to ensure that the outputs that the inputs reference have not been spent. If the inputs have not been spent, the notary updates the UTXO database to indicate that the referenced outputs have been spent, notarizes the transaction (e.g., by signing the transaction or a transaction identifier with a public key of the notary), and sends the notarization to the party that submitted the transaction for notarization. When the party receives the notarization, the party stores the notarization and provides the notarization to the counterparties.

When an entity wants to transact with another entity, for example, to purchase an asset, the entity needs to know the identity of the other entity and that the other entity owns the asset. To help enable such transactions, owners of assets could publicize that they are willing sell their assets and/or purchasers could publicize that they are willing to purchase assets. Each entity would need to publish sufficient information (e.g., asset, quantity, and price) so that another entity could make a decision on whether to propose a transaction.

A difficulty with entities publishing the information on their assets is that other entities would necessarily have access to the information. Thus, an entity with no interest in proposing a transaction for an asset would know the identity of prospective purchasers and/or sellers. Typically, entities would like to keep their information confidential until a transaction is proposed and only disclosed to the entities involved in the transaction. Although a central authority could publish the information on purchasers and sellers without revealing identities, the identity of the seller and the purchaser would need to be disclosed before the parties agree to the transaction. Once disclosed one of the parties may decide not to continue with the transaction, resulting in an unnecessary disclosure of identities. For example, if the parties are competitors or if one of the parties is on prohibited list of a government, they may not want to or cannot transact with each other. Also, a central authority may have an overhead and security risks that make it an impractical solution.

DETAILED DESCRIPTION

Figure 1:
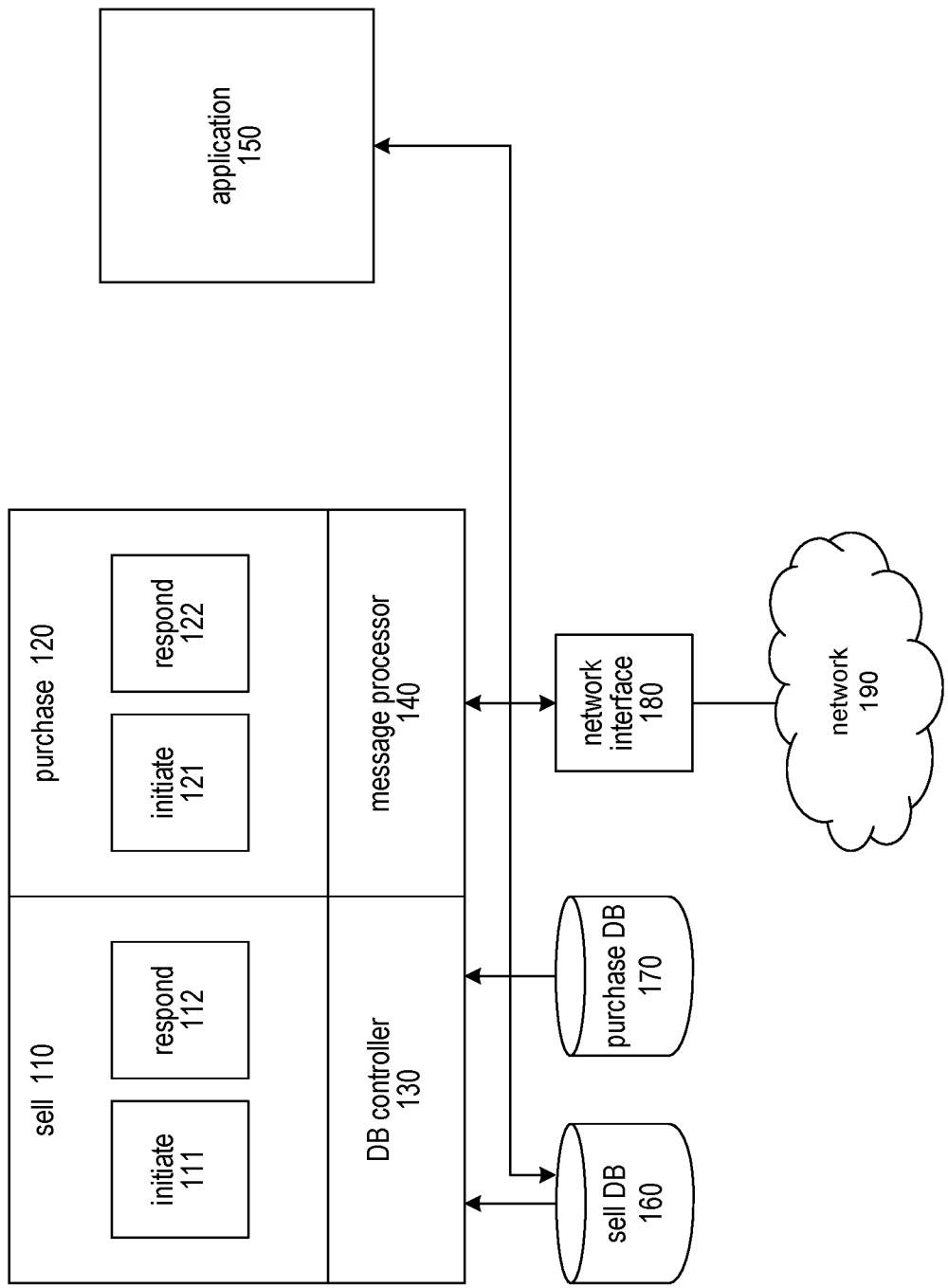
FIG. 1 is a block diagram that illustrates components of the CAT system in some embodiments.

Systems and methods are provided for controlling privacy relating to nodes of a decentralized distributed ledger network and for maintaining orders in a distributed manner at the nodes. In some embodiments, a confidential asset transaction (CAT) system broadcasts query offers to exchange (i.e., purchase or sell) assets from offeror nodes to offeree nodes of the distributed ledger. The CAT system ensures that the identity of an offeror is not revealed to an offeree and the identity of an offeree is not revealed to an offeror until it is determined that the asset can be exchanged in accordance with "terms of exchange" and "reveal conditions." For example, a purchaser (i.e., offeror) who wants to purchase stock of a company broadcasts an offer query that identifies the stock, offeror terms of exchange (e.g., quantity and price), and an offeror reveal condition. The offeror reveal condition may specify, for example, that the offer query should not be revealed to a company that is on a prohibited list of a government. A seller (i.e., offeree) who wants to sell stock of that company defines for the stock offeree terms of exchange and an offeree reveal condition. The offeree reveal condition may specify, for example, information about the offeree should not be revealed to a certain company (e.g., a competitor).

When an offeree node receives an offer query, the offeree node determines whether the offeror reveal condition and an offeree reveal condition for the asset are satisfied and whether the offeror terms of exchange and the offeree terms of exchange are satisfied. When the offeror reveal condition, the offeree reveal condition, the offeror terms of exchange, and the offeror terms of exchange are satisfied, the exchange of the asset can proceed, and the offeror can be revealed to the offeree and the offeree can be revealed to the offeror.

In some embodiments, when the exchange can proceed, the CAT system may create a new transaction to affect the exchange and record the transaction in a distributed ledger. The seller's ownership of the asset would have been established by a prior transaction that was previously recorded in the distributed ledger. To support creating the new transaction, the offer query may include an offeror private key of the offeror that is encrypted with an encryption key (e.g., public/private key or symmetric key) of the CAT system that may be stored in a secure enclave (e.g., based on the Intel Guard Extensions (SGX)). The CAT system may also have access to an offeror private key and an offeree private key which may also be stored in secure enclaves of the offeror node and the offeree node, respectively. The CAT system may sign the new transaction using the offeror private key and the offeree private key and submit the signed transaction to a notary node. The notary node ensures that the asset of the prior transaction has not been consumed (e.g., already sold), ensures that the signatures are correct (e.g., using public keys of the offeror and offeree), and notarizes the transaction. The notary then provides the transaction to the offeror and/or offeree for recording in their portions of the distributed ledgers (i.e., offeror portion and offeree portion). If the distributed ledger is a blockchain, then the transaction can be broadcasted to mining nodes for recording in the blockchain.

Although the CAT system is described primarily in the context of the purchase and sale of assets, the CAT system may be used for other types of exchanges such as leases, rent with option to purchase, and so on. The CAT system may be employed to preserve the privacy of parties to transactions relating to any type of asset such as stocks, bonds, precious metals, commodities (petroleum), options, certificates of deposit, cryptocurrency, real estate, treasury securities, and so on.

In some embodiments, the nodes of entities (e.g., node owner) may each maintain a database of the assets the entity is willing to purchase and is willing to sell. The database may include records that identify an asset, associated terms of exchange, and an associated reveal condition. The database may include a purchase database for assets the entity is willing to purchase and a sell database for assets the entity is willing to sell. The database of a node may also store information on assets that other entities are willing to purchase or sell. For example, the database of a node may store information on assets owned by different subsidiaries of a parent corporation.

In some embodiments, each node of an entity in the network has a purchase component and/or a sell component of the CAT system. The sell component of an entity maintains a sell database of assets that the entity owns and is willing to sell. The sell database contains records that may each identify an asset, terms of exchange, and a seller reveal condition under which the entity's willingness to sell the asset will be revealed to a purchaser. The information stored in each record may be specific to the type of asset. For example, the terms of exchange for a stock may be quantity and ask price and for an option may be quantity, ask price, and expiration date. The purchase component of an entity maintains a purchase database of assets that the entity is willing to purchase. The purchase database contains records that may identify an asset, terms of exchange, and a purchaser reveal condition under which the entity's willingness to purchase the asset will be revealed to a seller.

The reveal conditions may be of arbitrary complexity and may be specified by computer code that returns a yes or no value, a Boolean function that returns a 0 or a 1, and so on. For example, a reveal condition may be specified by a Boolean function that retrieves a certain index is above a certain dollar amount and the offeree is not on a prohibited list and if so, returns a 1 indicating an exchange can proceed. As another example, a reveal condition may be specified by computer code that retrieves an index indicating the spot price of gold, an exchange rate, and an interest rate (e.g., LIBOR) and that performs a calculation to determine whether an offer should be accepted and if so, returns true. A reveal condition may thus encode both the concept of reveal only to allowed entities and the concept of should the exchange be made given other conditions.

The sell component and the purchase component may each have an initiate and a respond component. When an offeror wants to initiate an exchange, the offeror node invokes the initiate component of the sell component or the purchase component depending on whether the offeror wants to sell or purchase an asset. When an offeree node receives an offer query, the offeree node invokes the respond component of the sell component or the purchase component depending on whether the offer is to purchase or sell an asset. The initiate components control the broadcasting of offer queries and processing of the exchange if an offer is accepted. The respond components control the responding to offer queries and processing of the exchange if an offer is accepted.

In some embodiments, computer-executable code of the CAT system may execute in a secure enclave. A secure enclave is a feature of a central processing unit ("CPU") in which trusted code and data of the code are stored in memory in encrypted form and decrypted only when retrieved for execution and use by the CPU. Such code is said to execute in the secure enclave. The CPU supports generating an attestation of the trusted code that executes in the secure enclave. The attestation includes a hash of the trusted code, an identifier of the CPU, and application data. The attestation is encrypted or signed by a CPU private key of a CPU public/private keypair that is stored in the CPU during manufacture of the CPU. The trusted code requests the CPU to provide the attestation and then provides the attestation to client code as evidence of the trusted code that executes in the secure enclave. The client code can request a service of the manufacturer of the CPU to provide the CPU public key of the CPU public/private keypair to decrypt or verify the signature. The client code can extract the hash to verify that the trusted code is the expected code and extract the application data. Such a secure enclave is provided by the Software Guard Extensions (SGX) feature provided by Intel Corporation.

The secure enclave creates a tamper-proof space for the code of the CAT system to execute, so that the node owner is not able to inspect or interfere with its execution. The secure enclave protects data at rest (within the secure enclave), in motion (between the secure enclave and storage), and during computation (within the secure enclave). Before engaging with secure enclave of a node, the secure enclave can produce an attestation that it has been secured, is running the correct code of the CAT system, and has not been tampered with. The code of the CAT system communicates with other nodes in the network using encrypted messages, for example, encrypted offer queries. The encryption may be based on public/private key pairs or symmetric keys of the CAT system. When the code of a secure enclave receives an offer query, the code decrypts the offer query and then determines whether the offer can be accepted. The details (and even the existence) of an offer query are not revealed to any node owners, operators, or observers unless allowed by the offer query.

In some embodiments, the sell database of a node includes a sell index and a sell table. The sell table includes a sell record for each asset that is for sale by the node owner, and the sell index includes an index entry for each asset. An asset that is to be offered for sale is associated with a data structure that includes an asset identifier (ID) and user-defined data (UDD). The asset identifier may be, for example, an International Securities Identification Number (ISIN). The UDD includes a reveal condition (Rcond), the quantity of the asset that is for sale (Qty), and the ask price (Pr). A sell record for an asset includes a hash of the UDD (h(UDD)) and an encrypted UDD (E[UDD, $K_{pub}$]) that is encrypted with a public key ($K_{pub}$). An index entry for an asset includes the ID, the h(UDD), the private key ($K_{priv}$) associated with the $K_{pub}$, and the Rcond. The Rcond of the index entry and the UDD may be the same or different. The purchase database may contain similar information for assets that the node owner is willing to purchase.

When an offeror wants to purchase an asset by broadcasting an offer query, the offeror node creates an offer query Q that includes the Type (i.e., purchase), the ID, the UDD, and the Rcond for the asset to be purchased and then broadcasts the offer query. When an offeree node receives the offer query, the offeree node invokes the respond component of the sell component. The respond component identifies index entries that have an ID that matches the ID of the offer query. When a match with an index entry is identified, the respond component evaluates whether the Rcond of the index entry is satisfied by the offer query and whether the Rcond of the offer query is satisfied. If satisfied, the respond component uses the h(UDD) of the index entry to retrieve the indexed sell record. (The sell index may be cached by the secure enclave, and the sell table may be stored outside of the secure enclave.) The respond component then decrypts E[UDD, $K_{pub}$] using $K_{priv}$ of the index entry (D[E[UDD, $K_{pub}$], $K_{priv}$]). The sell component determines whether the terms of exchange (e.g., quantity and prices) and the reveal condition of the UDD are satisfied and whether the terms and conditions and the reveal condition of the offer query are satisfied. If satisfied, then their identities can be revealed, and the sale can proceed. Although the Rcond of the index entry is described as being evaluated before accessing the sell table, it can be evaluated after the sell table is accessed and be based on content of the sell table. (An offeror may be considered an active entity in the sense that the offeror initiates the offer. An offeree, in contrast, may be considered a passive entity in the sense the offeree only responds to an offer initiated by another.)

In some embodiments, the offeror can be revealed to the offeree whether or not the offeree reveal condition is satisfied. Such revealing can be useful when the exchange requires manual approval from the offeree. For example, an offeree may require that all sales above a certain dollar amount have manual approval. In such a case, the decision on whether to approve may be based on the identity of an offeror and current sentiments (e.g., based on a recently announce criminal probe) about the offeror that cannot be effectively represented by an offeree reveal condition or terms of exchange.

The following pseudocode describes aspects of a sell component.

```
DATA STRUCTURES
    UDD =(Rcond, Qty, Pr) /*
    DB = Ind and Tbl /*sell index and sell table
    Tbl = {h(UDD), E[UDD, K_pub]}
    Ind = {ID, h(UDD), K_priv, Rcond}
    Q = (Type, ID, UDD, Rcond) /* offer query
SELL COMPONENT
    receive Q from offeror
    for each Ind entry
        if (Q.ID==Ind.ID), (Q.Rcond is satisfied),
            and (Ind.Rcond is satisfied)
            retrieve Tbl record for Ind.h(UDD)
```

```
UDD = D[(E[UDD, K_pub]), K_priv]
    if terms of exchange satisfied, reveal
        offeror to offeree and offeree to offeror
```

When an offeror creates an offer query, the offeror node sends a message with the offer query to all or a subset of the other nodes in the network. The offeror may construct the offer query based on assets to be purchased or sold that are recorded in the purchase and sell databases. The offeror node may automatically (e.g., on a period basis or when some other condition is satisfied) construct offer queries and send offer queries based on content of the purchase and sell databases.

In some embodiments, the purchase and sell databases of the nodes may be stored in a central repository managed by a trusted authority. Since the trusted authority has access to the $K_{pub}$/$K_{priv}$ keypairs (stored in the databases), the trusted authority can run analytics relating to the exchanges the entities are willing to participate in. The central repository may also employ a secure enclave.

Although the CAT system is described primarily in the context of the exchange of financial assets, the CAT system may be used to control access more generally to information, computer resources, and so on of node owners and preserve the privacy of node owners as specified by their reveal conditions. For example, node owners may collect various types of information and may want to initiate and/or respond to offer queries for access to the information. As another example, a node may have available compute power that the node owner would like to make available to others.

In some embodiments, the CAT system may generate an exposure score for a node. The exposure score for a node indicates relative level of data exposure, the value and utility of the data revealed, and activities related to the data exposure. For example, an offeree may receive multiple offers from the same offeror to purchase small quantities of an asset at varying bid prices. The acceptance of offers with bid prices above the ask price set by the offeree and the non-acceptance of offers with bid prices below the ask price may allow the offeror to generate an approximation of the ask price. In such a case, the exposure score for the offeree may be relatively high since the ask price can be approximated. To support the generating of exposure scores, the CAT system of a node maintains a record of all offer queries initiated and received and whether they were accepted and the reasons why. The CAT system at each node may periodically provide this information to an exposure assessment system. The exposure assessment can then generate the exposure score factoring exposure activity of other nodes. The exposure system may be centralized or distributed. The exposure assessment system may execute in a secure enclave and may publish the algorithm used to generate the exposure score.

FIG. 1 is a block diagram that illustrates components of the CAT system in some embodiments. The CAT system 100 includes a sell component 110, a purchase component 120, a database controller 130, and a message processor 140. The sell component includes an initiate component 111 and a respond component 112, and the purchase component includes an initiate component 121, and a respond component 122. As described above, the initiate component of the sell component is invoked to broadcast a sell query, and the respond component of the sell component is invoked to respond to a purchase query. The initiate component of the purchase component is invoked to broadcast a purchase query, and the respond component of the purchase component is invoked to respond to a sell query. The database controller receives instructions from the sell and purchase components to retrieve from and store data in a sell database 160 and a purchase database 170. The database controller controls the encrypting and decrypting of data that is sent to and received from the databases. The message processor interfaces with a network interface 180 to receive messages from the sell and purchase components and send the messages via the network 190 and receive messages from the network and send them to the sell and purchase components. The message processor may encrypt the messages according to the protocol employed by the network. An application 150 interfaces with the databases and allows the node owner to control the populating of the sell and purchase databases. The application may also store information in the databases related to the scheduling of sending offer queries, timing of responding to offer queries, and other information for controlling the operation of the CAT system.

Figure 2:
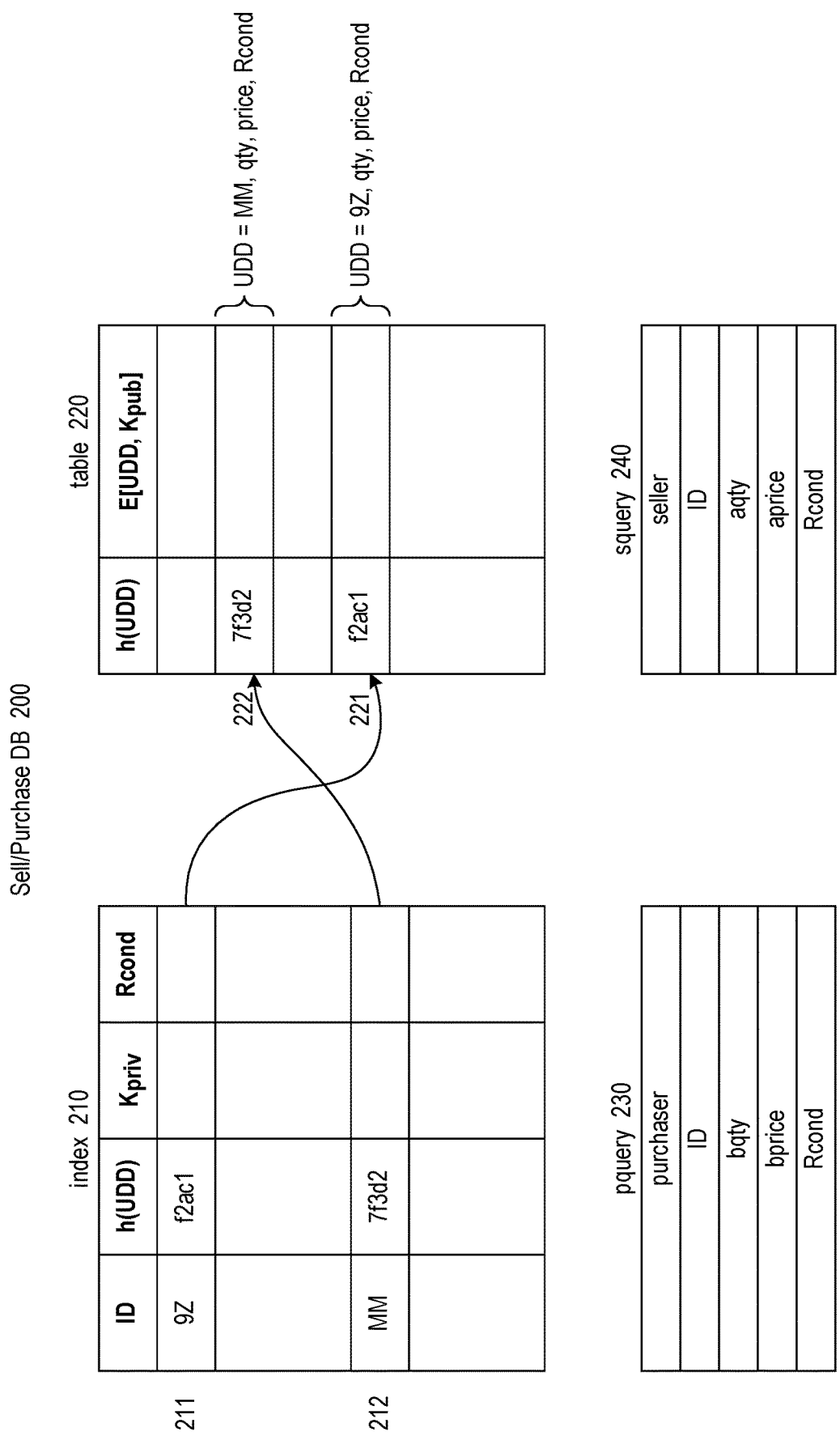
FIG. 2 is a block diagram that illustrates the sell and purchase databases.

FIG. 2 is a block diagram that illustrates the sell and purchase databases. The sell and purchase databases 200 may have the same structure and contain essentially the same content. A table 220 contains a record and an index 210 contains an index for each asset that is to be purchased or to be sold. For example, index 211 represents an asset identified by "9Z" and includes the hash "f2ac1" associated with record 221, and index 212 represents an asset identified by "MM" and includes the hash "7f3d2" associated with record 222. Purchase query 230 and sell query 240 illustrate the content of offer queries. The purchase query (pquery) includes a purchaser identifier, an asset identifier (ID), a bid quantity (bqty), a bid price (bprice), and a reveal condition. The sell query (squery) includes a purchaser identifier, an asset identifier (ID), an ask quantity (aqty), an ask price (aprice), and a reveal condition.

The computing systems (e.g., nodes) on which the CAT system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media (or mediums) and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the CAT system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The CAT system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the CAT system may be implemented in hardware using, for example, an application-specific integrated circuit (ASIC) or field programmable gate array ("FPGA").

Figure 3:
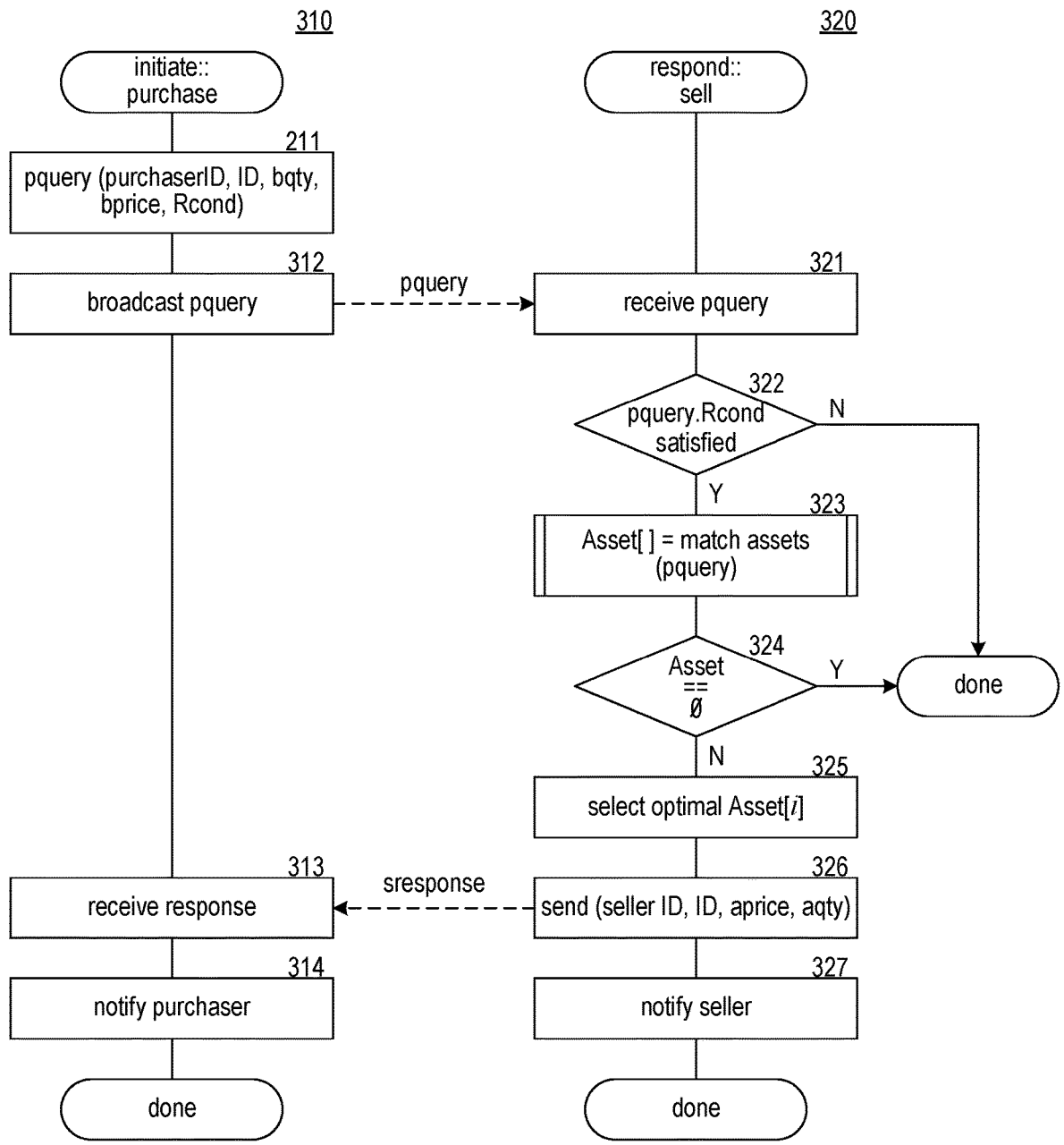
FIG. 3 is a flow diagram that illustrates the processing of an offer query that is a purchase query.

FIG. 3 is a flow diagram that illustrates the processing of an offer query that is a purchase query. An initiate component 310 of the purchase component on a purchaser's node, which may execute in a secure enclave, controls the sending of the purchase query and processing of a response. A respond component 320 of the sell component of a seller's node controls the responding to the purchase query. In block 311, the initiate component creates the purchase query. In block 312, the initiate component broadcasts the purchase query. In block 321, the respond component receives the purchase query. In decision block 312, if the reveal condition of the purchase query is satisfied, then the component continues at block 323, else the component completes. In block 323, the component invokes a match assets component to determine whether any assets of the sell database match the purchase query. In decision block 324, if no asset matches, then the component completes without revealing the purchaser to the seller and without responding so that the seller is not revealed to the purchaser, else the component continues at block 325. In block 325, the component selects an asset based on some criterion such as the asset with the highest quantity less that the purchase quantity, for example, if the terms of exchange indicate that the exchange can be for a quantity that is less than the purchase quantity indicated in the purchase offer. In block 326, the component sends information on the asset to the purchaser. In block 327, the component then notifies the seller and completes. In block 313, the component receives the response. In block 314, the component then notifies the purchaser and then completes. If a response is not received from the seller, then the seller is not revealed to the purchaser. The purchaser and the seller can then consummate the transaction. Alternatively, as described above, the transaction can be automatically created, notarized, and recorded.

Figure 4:
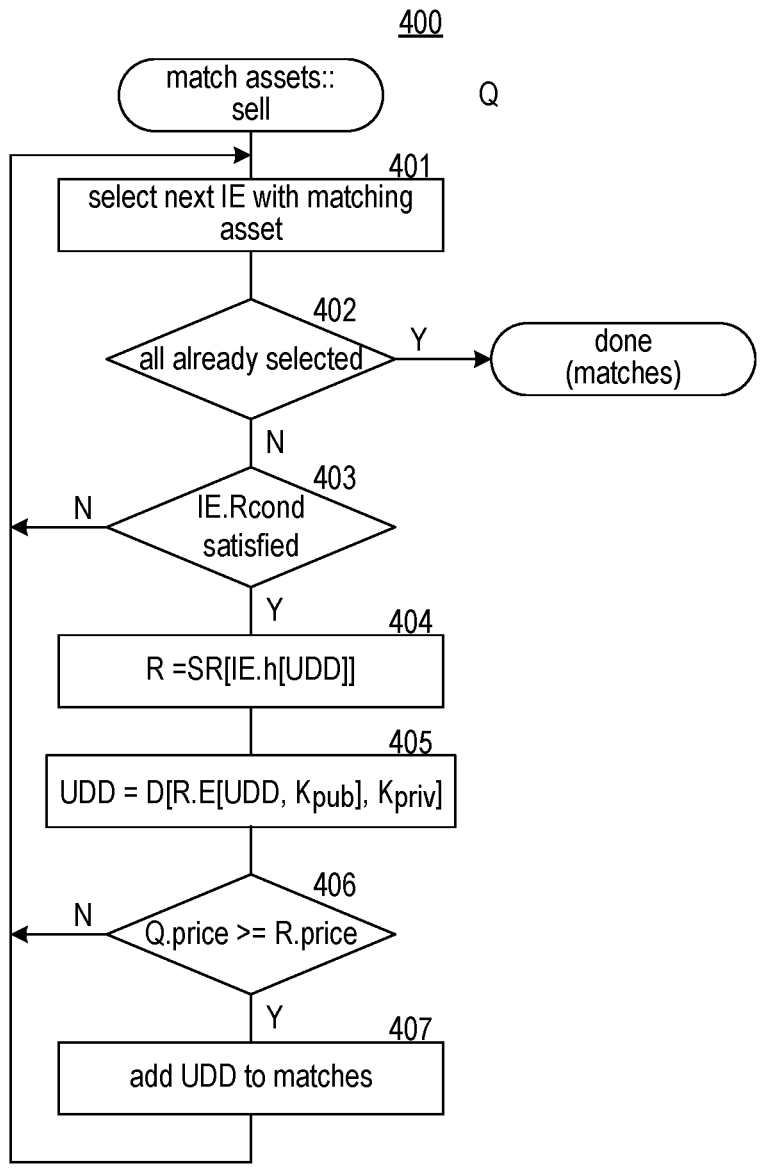
FIG. 4 is a flow diagram that illustrates the processing of the match assets component of the CAT system in some embodiments.

FIG. 4 is a flow diagram that illustrates the processing of the match assets component of the CAT system in some embodiments. The match assets component 400, which may execute in a secure enclave, is provided a query and identifies assets that match the query. In block 401, the component selects the next index entry of the sell index with a matching asset. In decision block 402, if all the matching assets have already been selected, then the component returns an indication of the matches (if any), else the component continues at block 403. In decision block 403, if the reveal condition of the index entry is satisfied, then the component continues at block 404, else the component loops to block 401 to select the next index entry with a matching asset. In block 404, the component retrieves the sell record identified by the index entry. In block 405, the component decrypts the user-defined data of the sell record. In decision block 406, if the bid price of the purchase query is greater than or equal to the ask price of the sell record, then the component continues at block 407, else the component continues at block 401 to select the next index entry with a matching asset. In block 407, the component adds the user-defined data to a set of matching assets and then loops to block 401 to select the next index entry with a matching asset.

In some embodiments, a distributed order book (DOB) system supports a network of nodes that maintains a distributed order book of orders and that matches incoming orders with pending orders. The DOB system may include a platform component and a node component. The platform component executes on a server system that supports communications between the node component executing on each node. The node component at each node may maintain an owner sell table listing sell orders for assets the node owner (or other user) has created and an owner purchase table listing purchase orders for assets the node owner has created. In addition, the node component at each node maintains a local copy of a pending sell table that stores pending sell orders for assets and a local copy of a pending purchase table that stores pending purchase orders for assets. The pending sell tables and the pending order tables of the nodes form the distributed order book. The pending sell tables and pending purchase tables are updated in real time as orders are placed and matched. For example, when a sell order is placed and matched with a pending purchase order, the pending purchase order is removed from pending purchase tables of the nodes. When the sell order cannot be matched with a pending purchase order, the sell order is added to the pending sell tables of the nodes as a pending sell order.

A node owner may interact with a user interface of the node component to create sell orders and purchase orders. The node component may initially store the order in their corresponding table. When the node owner decides to place an order (assuming it is a firm order), the node component searches the local copy of the pending table of the node for a matching order. (The pending table refers to the combination of pending sell table and pending order table.) For example, if the node owner publishes a sell order, the node component searches the pending purchase table for a pending purchase order that matches the sell order. If a match is found at the node, the node component initiates a post-trade validation to, for example, to ensure that that purchase order was not already matched with a sell order that has not yet been reflected in the pending table. Assuming the trade is validated (e.g., no longer outstanding) which may be performed by the platform component), the platform component notifies the node components to update their pending purchase tables to remove the matched purchase order.

If a match is not found at the node, the node component notifies the platform component that the sell order is being published. Upon receiving the sell order, the platform component notifies the node components of the nodes to update their pending sell tables to add the sell order. Upon receiving a sell order, a node component may search its local purchase table for a purchase order that the node owner has not published but would like filled. If a match is found, the node component initiates a post-trade validation that is performed as described above. Assuming the trade is validated, the platform component notifies the node components to update their pending sell tables to remove the sell order that was just added but has been matched by an unpublished purchase order. A trade may not be validated, for example, if another node finds and validates a match first. A similar matching occurs when a node owner decides to publish a purchase order.

The DOB system may support use of reveal conditions as described above. Each order may have a reveal condition that is stored in the pending table as part of an order. The orders may be stored in the pending tables in an encrypted form and decrypted by the node component when checking for a match. The node component may execute in a secure enclave. In addition to being matched based on asset identifier, quantity, and price, orders may be matched based on reveal conditions. For example, investment firm A may not want to purchase assets from investment firm B. In such as case, investment firm A may have a reveal condition on a purchase order to not reveal to investment firm B. Investment firm B may not be able to determine the reason for the purchase order not matching because details of the order are not revealed to investment firm B. In addition, the node component may not have separate pending sell and pending purchase tables to help prevent a node from even determining if a received order is a sell or a purchase order.

In addition to supporting firm orders, the DOB system may also support indicative orders. The DOB system may process indicative orders in a similar manner to firm orders except that matching orders are not automatically executed. Rather, when indicative orders are matched, the seller and the purchaser are provided the option to negotiate the terms of the transaction. For example, a node owner may respond to the publishing of an indicative order by requesting a chat session with the publisher of the indicative order. The publisher and the responder can then execute the transaction if an agreement is reached based on the negotiated terms. The DOB system may also support high-level order in a manner that is similar to firm orders.

The DOB system may allow orders to specify reveal conditions as described above so that information relating to offerors and offerees are only revealed in accordance with the reveal conditions.

Figure 5:
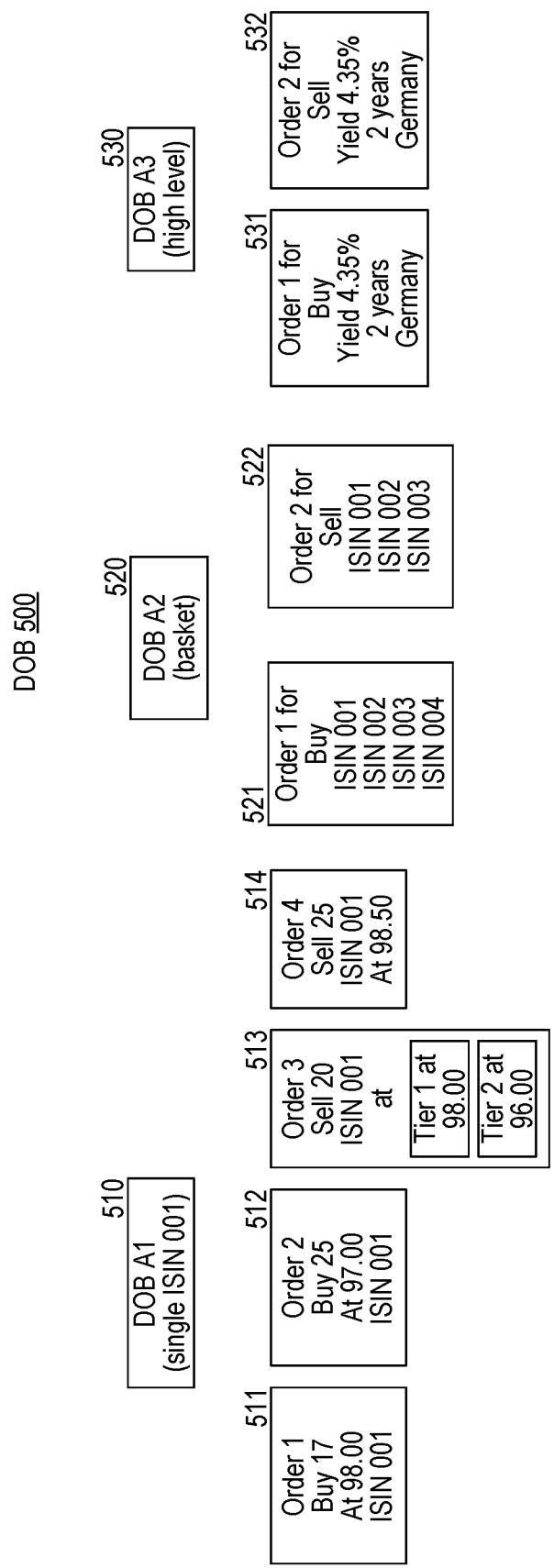
FIG. 5 is block diagram that illustrates a distributed order book in some embodiments.

FIG. 5 is block diagram that illustrates a distributed order book in some embodiments. DOB 500 includes pending orders 510 of client A1 (e.g., node owner or user), pending orders 520 of client A2, and pending orders 530 of client A3. Client A1 has pending orders for ISIN 001 including purchase (buy) order 511 for a quantity of 17 at a price of 98.00, purchase order 512 for a quantity of 25 at a price of 96.00, sell order 513 for a quantity of 20 at tier 1 and tier 2 prices of 98.00 and 96.00, and sell order 514 for a quantity of 25 at a price of 98.50. Client A2 has pending purchase order 521 for a basket of ISINs and sell order 522 for a basket of ISINs, which may be indicative orders to explore potential prices for the baskets. Client A3 has pending purchase order 531 for a 2-year German bond with a yield of 4.35% and pending sell order 532 for a 2-year German bond with a yield of 4.35%. The orders for the German bonds are high-level orders because they can be matched with any 2-year German bond with such a yield, for example, irrespective of maturity. The illustrated orders may be stored in the pending tables at each node of the network. The DOB system 540 matches incoming orders to pending orders if possible and if not possible, adds incoming orders as pending orders in the DOB.

Figure 6:
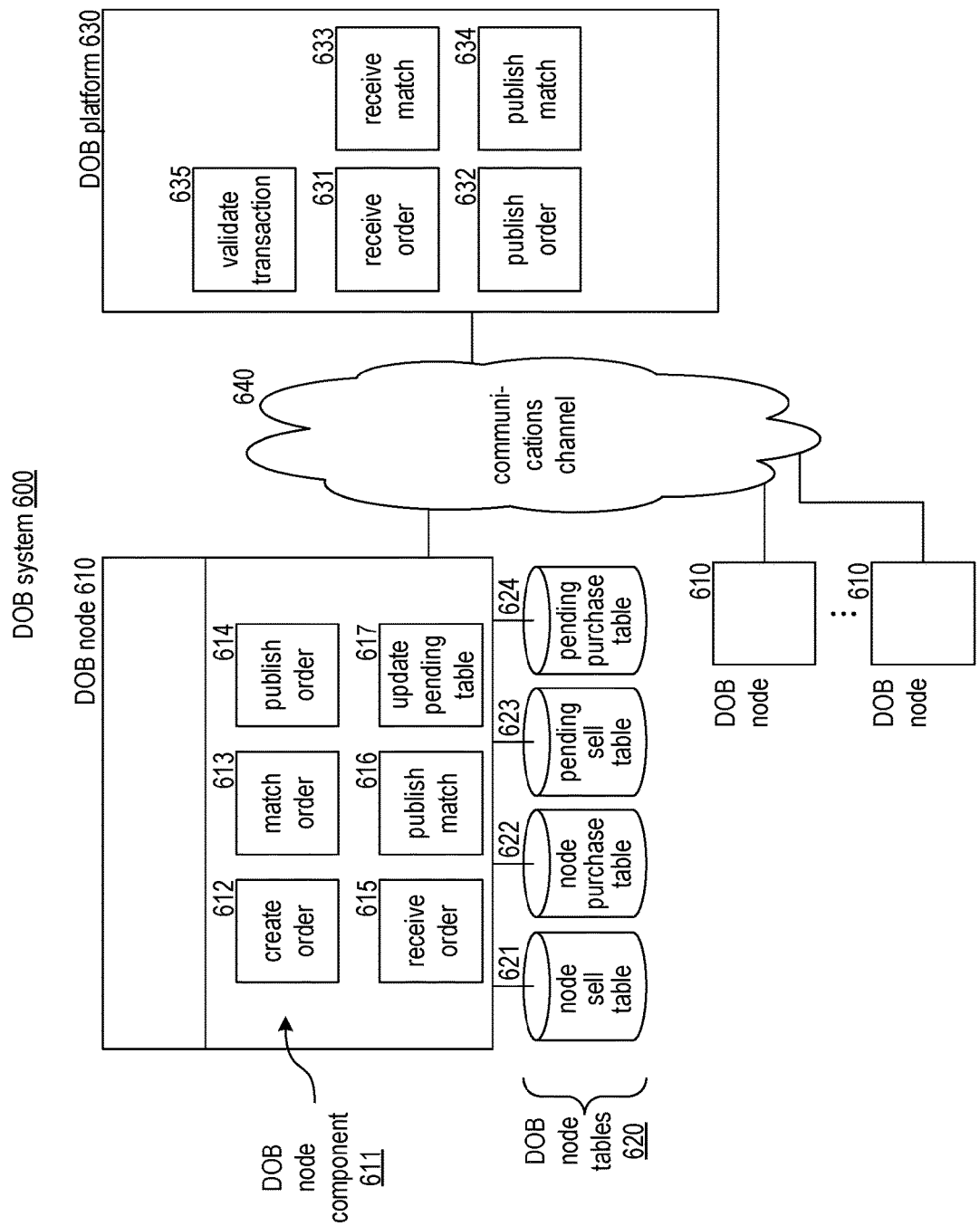
FIG. 6 is a block diagram that illustrates components of the DOB system in some embodiments.

FIG. 6 is a block diagram that illustrates components of the DOB system in some embodiments. The DOB system includes DOB nodes 610 and a DOB platform 630 that are interconnected via a communications link 640. The communications link may be the internet or may be a high-speed link within a data center that houses the DOB nodes and the DOB platform. When the DOB nodes and DOB platform are housed in the same data center or data centers interconnected with a very high-speed communications links (e.g., direct optic fiber), the matching of orders can proceed at nearly the highest rate that is technologically feasible. The components of the DOB system may execute in a secure enclave as described above.

A DOB node includes a DOB node component 611 that includes a create order component 612, a match order component 613, a publish order component 614, a receive order component 615, a publish match component 616, and an update pending table component 617. The DOB node component interfaces with DOB node tables 620 that include a node sell table 621, a node purchase table 622, a pending sell table 623, and a pending purchase table 624.

The create order component provides a user interface that allows user to enter sell and purchase orders and performs validations to ensure, for example, the ISIN is valid. The create order component stores the order in the node table. When the user decides to have the order filled, the node component invokes the match order component. The match order component checks the pending table to determine whether a matching order is pending. If so, the match order component matches the orders, and the publish match component notifies the DOB platform (which may perform a validation). If there is no matching order pending, the node component invokes the publish order component to publish the order by sending the order to the DOB platform.

When the DOB node receives an order, the node component invokes the receive order component. The receive order component determines whether there is a matching order in the node table (that is available to be matched). If so, the orders are matched, and the publish match component notifies the DOB platform (which may perform a validation). If there is no order to match, the update pending table component stores the received order in the pending table.

The node component invokes the update pending table component to update the pending sell table and the pending purchase table based on update notifications received from the DOB platform. The update notifications may indicate to remove an order that has been matched, that is no longer valid, or that for some other reason cannot be matched (e.g., government intervention). The DOB platform may also provide other notifications that do not result in update of a pending table such as a notification that trading of single ISIN or a group of ISINs is suspended.

The DOB platform includes a receive order component 631, a publish order component 632, a receive match component 633, a publish match component 634, and a validate transaction component 635. The receive order component receives orders from nodes that were not matched locally at the node. The platform invokes the publish order component to publish a received order to the nodes so that the nodes can check for an immediate match and if none, store in the order in the pending table. The receive match component receives from a node an indication of an order that has been matched. The receive match component invokes the validate transaction component to ensure that both orders are still pending and available to be matched. An order may not be available to match, for example, if it was recently matched with another order. The validate transaction component may maintain a transaction database (not shown) that contains a log of all transactions and uses the transaction database to ensure that an order is still pending. When a transaction has been validated, the receive match component invokes the publish match component to notify the nodes that the order has been filled so that they can be removed the order from the pending tables.

Figure 7:
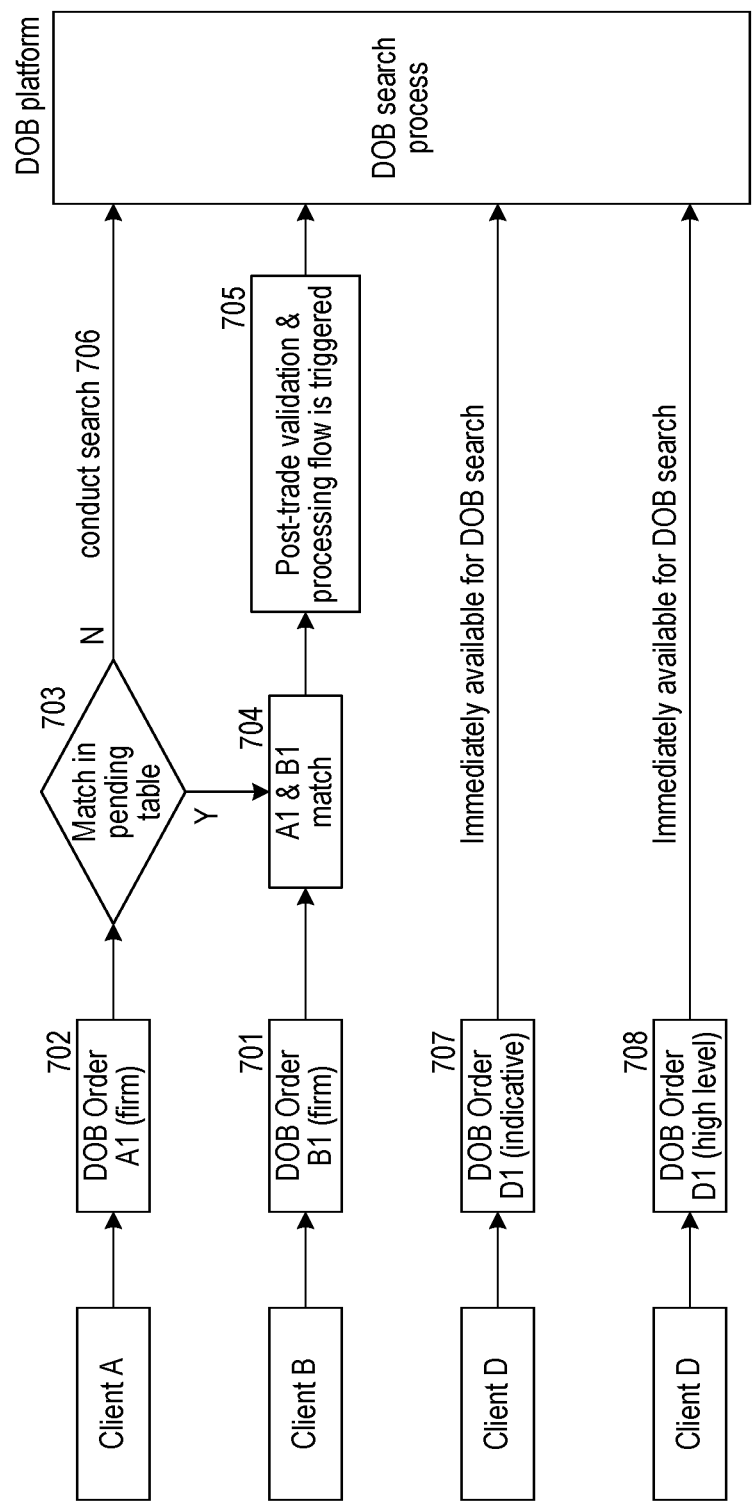
FIG. 7 is a block diagram that illustrates processing of flow of an immediate match and distributed search.

FIG. 7 is a block diagram that illustrates processing flow of an immediate match and distributed search. Initially, client B creates 701 a firm order that is not immediately matched so it is stored in the DOB. Client A then creates 702 a firm order. Client A checks 703 if there is a match in the DOB. In this case, a match is found 704 with the firm order of client B and a post-trade validation 705 is triggered. If a match was not found, a search 706 of the DOB would be initiated. Client D may create 707 an indicative order and create 708 a high-level order. Both orders are matched in a way that is similar to that of a firm order.

Figure 8:
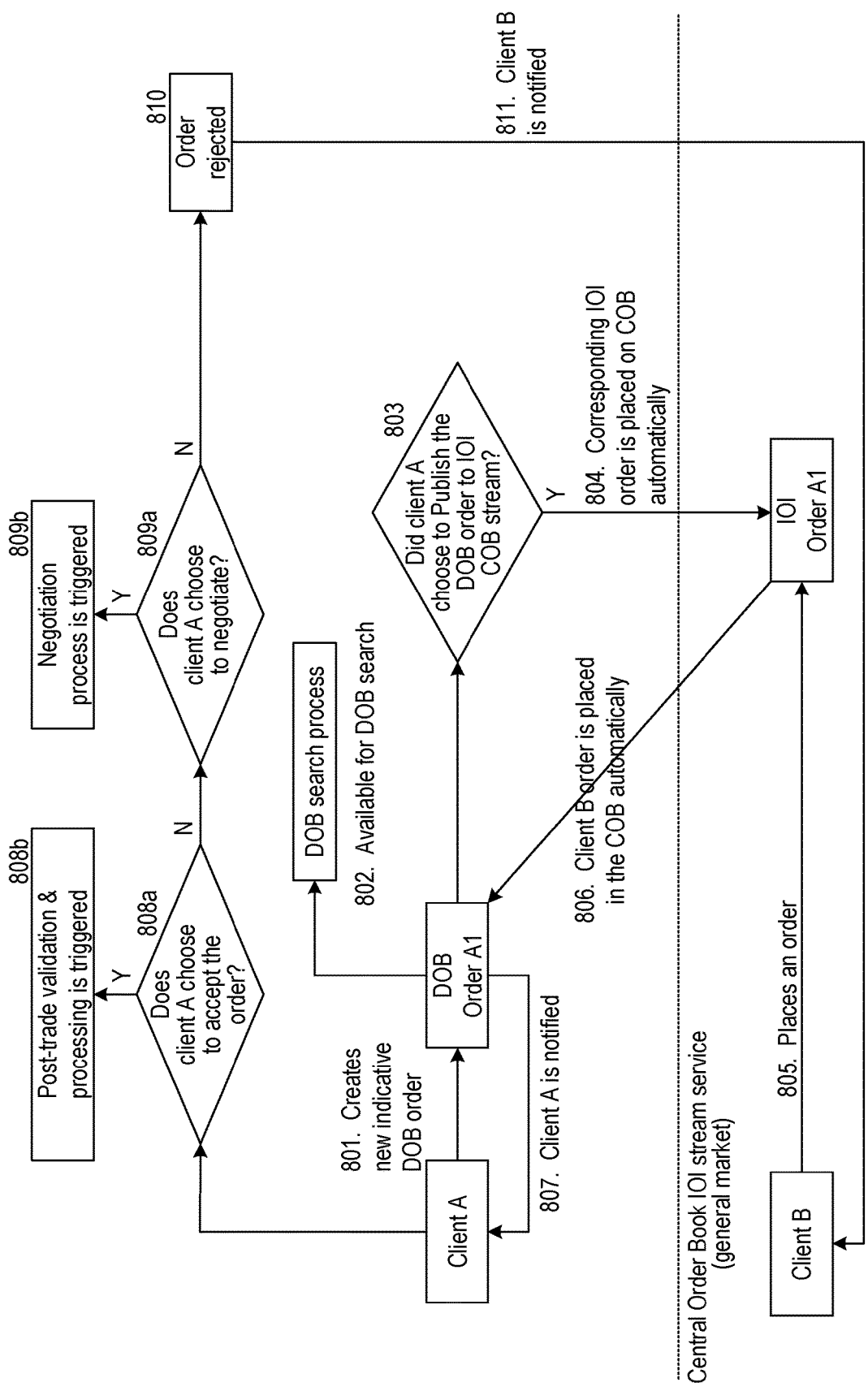
FIG. 8 illustrates interactions between the distributed order book (DOB) and the central order book (COB) in some embodiments.

FIG. 8 illustrates interactions between the distributed order book (DOB) and the central order book (COB) in some embodiments. The interactions relate to indicative orders and are referred to as an Indications of Interest (IOI) stream. Initially, client A creates 801 a new indicative DOB order (order A) and initiates 802 a search. In addition, if client A elects 803 to publish order A to the IOI COB stream, a corresponding IOI order is placed 804 on the COB, which may be maintained by a platform. If client B places 805 an order (order B) on the IOI stream service that matches the order, order B is published 806 to the DOB. When the match between order A and order B is detected, client A is notified 807. If client A accepts 808*a* the order B, then post-trade validation proceeds 808*b*. Otherwise, if client A elects 809*a* to negotiate with client B, a negotiation process is triggered 809*b*. If client A elects not to negotiate, order B is rejected 810 and client B is notified 811.

The following paragraphs describe various embodiments of aspects of the CAT system and the DOB system. Implementations of the CAT system and the DOB system may employ any combination of the embodiments. The processing described below may be performed by a computing device with a processor that executes computer-executable instructions stored on a computer-readable storage medium that implements the CAT system and the DOB system.

In some embodiments, a method performed by one or more computing systems for controlling privacy in an exchange of an asset is provided. The method receives an offer query of an offeror that includes an offeror reveal condition, an asset identifier of the asset, and offeror terms of exchange. The method accesses an offeree reveal condition and offeree terms of exchange for the asset. The method determines whether the offeror reveal condition and the offeree reveal condition are satisfied. The method determines whether the offeror terms of exchange and the offeree terms of exchange are satisfied. When the offeror reveal condition, the offeree reveal condition, the offeror terms of exchange, and the offeree terms of exchange are satisfied, the method directs the revealing of the offeror to the offeree and the revealing of the offeree to the offeror. In some embodiments, the offer query represents an offer to purchase the asset. In some embodiments, the offer query represents an offer to sell the asset. In some embodiments, the determining of whether the offeror reveal condition is satisfied by executing computer-executable instructions included in the offer query. In some embodiments, the reveal conditions are expressed using Boolean operators. In some embodiments, the method further accesses an offeree database that includes an index and a table. The table includes a record for each asset that is available to be exchanged and a quantity of the asset and a price. The index includes an entry for each record that identifies the record, the asset of the record, and a reveal condition to be satisfied when the asset is to be exchanged. In some embodiments, the method further directs the recording of a transaction in accordance with the offeror terms of exchange and the offeree terms of exchange. In some embodiments, the method further, before recording the transaction, directs notarization the transaction. In some embodiments, the offeror maintains an offeror portion of a distributed ledger and the offeree maintains an offeree portion of the distributed ledger and the recording of the transaction includes storing the transaction in the offeror portion and the offeree portion. In some embodiments, the offeror controls access to the offeror portion and the offeree controls access to the offeree portion. In some embodiments, the offer query is created by an offeror node of a distributed ledger and is broadcast to nodes of the distributed ledger. In some embodiments, the nodes include a secure enclave for executing instructions for controlling privacy. In some embodiments, the secure enclaves of the nodes exchange attestations. The offer query is encrypted by code executing in a secure enclave of the offeror node. In some embodiments, the method further notifies a central authority that an offer query was received and that the offeror reveal condition, the offeree reveal condition, the offeror terms of exchange, and the offeror terms of exchange are satisfied. In some embodiments, the method is performed by a secure enclave of the one or more computing systems.

In some embodiments, one or more computing systems for controlling privacy between entities are provided. The one or more computing systems include one or more computer-readable storage mediums for storing computer-executable instructions for controlling the one or more computing systems and one or more processors for executing the computer-executable instructions stored in the one or more computer-readable storage mediums. The instructions receive a first reveal condition of a first entity. The instructions access a second reveal condition of a second entity. The instructions determine whether the first reveal condition and the second reveal condition are satisfied. When the first reveal condition and the second reveal condition are satisfied, the instructions direct the revealing of first entity to the second entity and the second entity to the first entity. In some embodiments, the first reveal condition is associated with an offeror of an offer to exchange an asset and the second reveal condition is associated with an offeree of the offer to exchange the asset. In some embodiments, the offer includes an identification of the asset and offeror terms of exchange of the asset. In some embodiments, the instructions further determine whether first terms of exchange of the first entity are satisfied and second terms of exchange are of the second entity are satisfied and when the first terms of exchange and the second terms of exchange are satisfied, direct the exchange of the asset. In some embodiments, the first reveal condition and the first terms of exchange are stored in a first database that includes an index and a table. The table includes a record for each asset that is available to be exchanged and a quantity of the asset and a price, the index including an entry for each record that identifies the record, the asset of the record, and a reveal condition to be satisfied when the asset is to be exchanged. In some embodiments, the instructions further record a transaction to transfer the asset from the first entity to second entity in accordance with the first terms of exchange and the second terms of exchange. In some embodiments, the instructions further, before recording the transaction, direct notarization the transaction. In some embodiments, the instructions execute within a secure enclave of the one or more computing systems. In some embodiments, the instructions that determine of whether a first reveal condition is satisfied control execution computer code that implements the first reveal condition. In some embodiments, the first reveal condition is encrypted with an encryption key and the first reveal condition is decrypted by instructions executing in a secure enclave of the one or more computing systems. In some embodiments, the first reveal condition is broadcast by a first node of a first entity to other nodes of a network of nodes.

In some embodiments, one or more computing systems for matching offers based on a distributed order book. The one or more computing systems include one or more computer-readable storage mediums for storing computer-executable instructions for controlling the one or more computing systems and one or more processors for executing the computer-executable instructions stored in the one or more computer-readable storage mediums. The instructions execute under control of a node of a network of nodes. The instructions receive indications of pending offers by offerors to exchange an asset. The offers include offeror terms of exchange of the asset. The instructions receive indications of offers that are no longer pending. The instructions maintain a pending offer table that lists pending offers of offerors by adding pending offers to the pending offer table and removing offers that are no longer pending. The instructions access entity terms of exchange of assets of an entity associated with the node. For each entity terms of exchange, the instructions determine whether the pending offer table lists matching pending offers with offeror terms of exchange that match the entity terms of exchange. The instructions, when the pending offer table lists a matching pending offer for an entity terms of exchange, direct recording of a transaction to exchange the asset in accordance with the offeror terms of exchange of the matching pending offer and the entity terms of exchange and remove from the pending offer table the matching pending offer. In some embodiments, the instructions further direct sending to nodes of the network an indication that the matching pending offer is no longer pending. In some embodiments, the instructions further direct sending to a platform of the network an indication that the matching pending offer is no longer pending so that the platform can send to nodes of the network an indication that the matching pending offer is no longer pending. In some embodiments, a central authority validates the transaction prior to the transaction being recorded to verify whether the matching pending offer is still pending. In some embodiments, the instructions further, when the pending offer table does not list a matching pending offer for an entity terms of exchange, direct sending to nodes of the network an indication of a pending offer based on the entity terms of exchange. In some embodiments, each pending offer is associated with a reveal condition indicating when the pending offer can be revealed to the entity. In some embodiments, entity terms of exchange is associated with a reveal condition indicating when information of the entity terms of exchange can be revealed to an offeror of a pending offer. In some embodiments, the instructions further, when a matching pending offer is for an indicative order, send to a node of the offeror of the matching pending order an indication of an intent to negotiate.

In some embodiments, a method performed by nodes of a network of nodes for matching offers is provided. The method performs the following under control of a node. The method receives pending offers by offerors to enter a transaction. The method receives indications of offers that are no longer pending. The method updates pending offer information to include pending offers of the offerors and to not include offers that are no longer pending. The method accesses an entity offer to enter a transaction. The method, when the pending offer table lists a matching pending offer that matches the entity offer, directs recording of a transaction based on the matching pending offer and the entity offer and removing from the pending offer table the matching pending offer. In some embodiments, the method further sends to nodes of the network an indication that the matching pending offer is no longer pending. In some embodiments, each node of the network maintains a portion of a distributed ledger that contains transactions of the entity associated with that node. In some embodiments, each node of the network maintains a portion of a distributed ledger that contains only transactions of the entity associated with that node. In some embodiments, the method further sends to a platform of the network an indication that the matching pending offer is no longer pending so that the platform can send to nodes of the network an indication that the matching pending offer is no longer pending. In some embodiments, a central authority validates the transaction prior to the transaction being recorded to verify whether the matching pending offer is still pending. In some embodiments, the method further, when the pending offer table does not list a matching pending offer, sends to nodes of the network an indication of a pending offer of the entity. In some embodiments, each pending offer is associated with a reveal condition indicating when the pending offer can be revealed to the entity. In some embodiments, the entity offer is associated with a reveal condition indicating when information of the entity offer can be revealed to an offeror of a pending offer. In some embodiments, a pending offer has offeror transactions terms and an entity offer has entity transaction terms and a matching pending offer has offeror transaction terms that match the entity transaction terms. In some embodiments, the method further, when a matching pending offer is for an indicative order, sends to a node of the offeror of the matching pending order an indication of an intent to negotiate.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, although described primarily in the context of transactions that are exchange of assets, the transactions may relate other tangible and nontangible things, interactions between people, and so on. For example, a transaction may be to exchange information, exchange positions in a queue, register for a service, sign up for a medical procedure, match two people based on reveal conditions (e.g., dating service), and so on. The terms of exchange may more generally be considered to be transaction terms. Accordingly, the invention is not limited except as by the appended claims.

The invention claimed is:

1. A method performed by one or more computing systems for controlling privacy in an exchange of an asset, the method comprising:
generating, via a central processing unit (CPU), an attestation of trusted code, the attestation comprising a hash of the trusted code, an identifier of the CPU, and application data, wherein the trusted code is encrypted and executes in a secure space;
authenticating the attestation;
based on authentication of the attestation and under control of the trusted code of the secure space,
receiving an encrypted offer query of an offeror that includes an offeror reveal condition, an asset identifier of the asset, and offeror terms of exchange, the encrypted offer query being encrypted with a public key associated with the secure space;
decrypting the encrypted offer query;
accessing an offeree reveal condition and offeree terms of exchange for the asset;
determining whether the offeror reveal condition and the offeree reveal condition are satisfied;
determining whether the offeror terms of exchange and the offeree terms of exchange are satisfied; and
when the offeror reveal condition, the offeree reveal condition, the offeror terms of exchange, and the offeree terms of exchange are satisfied,
directing revealing of the offeror to the offeree; and
directing revealing of the offeree to the offeror;
recording a transaction in a secure space associated with a plurality of nodes; and
wherein the offeror of the offer query is not revealed to any entity until the offeror reveal condition, the offeree reveal condition, the offeror terms of exchange, and the offeree terms of exchange are determined to be satisfied.

2. The method of claim 1 wherein the offer query represents an offer to purchase the asset.

3. The method of claim 1 wherein the offer query represents an offer to sell the asset.

4. The method of claim 1 wherein the determining of whether the offeror reveal condition is satisfied by executing computer-executable instructions included in the offer query.

5. The method of claim 1 wherein the reveal conditions are expressed using Boolean operators.

6. The method of claim 1 further comprising accessing an offeree database that includes an index and a table, the table including a record for each asset that is available to be exchanged and a quantity of the asset and a price, the index including an entry for each record that identifies the record, the asset of the record, and a reveal condition to be satisfied when the asset is to be exchanged.

7. The method of claim 1 further comprising, before recording the transaction, directing notarization the transaction.

8. The method of claim 1 wherein the offeror maintains an offeror portion of a distributed ledger and the offeree maintains an offeree portion of the distributed ledger and the recording of the transaction includes storing the transaction in the offeror portion and the offeree portion.

9. The method of claim 8 wherein the offeror controls access to the offeror portion and the offeree controls access to the offeree portion.

10. The method of claim 1 wherein the offer query having been created by an offeror node of a distributed ledger and broadcast to nodes of the distributed ledger.

11. The method of claim 10 wherein each node of the nodes includes a secure enclave with code for controlling privacy.

12. The method of claim 11 wherein the secure enclaves of the nodes exchange attestations.

13. The method of claim 12 wherein the offer query is encrypted by code executing in a secure enclave of the offeror node.

14. The method of claim 1 further comprising notifying a central authority that an offer query was received and that the offeror reveal condition, the offeree reveal condition, the offeror terms of exchange, and the offeror terms of exchange are satisfied.

15. One or more computing systems for controlling privacy between entities, the one or more computing systems comprising:
one or more computer-readable storage mediums for storing computer-executable instructions for controlling the one or more computing systems to:
generate, via a central processing unit (CPU), an attestation of trusted code, the attestation comprising a hash of the trusted code, an identifier of the CPU, and application data, wherein the trusted code is encrypted and executes in a secure space of a first node;

receive a first reveal condition of a first entity, the first reveal condition encrypted with a private key of the first node;

verifying that the attestation represents the trusted code;

decrypting the first reveal condition with a public key of the first node;

access a second reveal condition of a second entity;

determine whether the first reveal condition and the second reveal condition are satisfied; and when the first reveal condition and the second reveal condition are satisfied, direct the revealing of first entity to the second entity and the second entity to the first entity;

recording a transaction in a secure space associated with a plurality of nodes;

wherein the first entity is not revealed to any entity and the second entity is not revealed to any entity until the first reveal condition and the second reveal condition are determined to be satisfied; and one or more processors for executing the computer-executable instructions stored in the one or more computer-readable storage mediums.

16. The one or more computing systems of claim 15 wherein the first reveal condition is associated with an offeror of an offer to exchange an asset and the second reveal condition is associated with an offeree of the offer to exchange the asset.

17. The one or more computing systems of claim 16 wherein the offer includes an identification of the asset and offeror terms of exchange of the asset.

18. The one or more computing systems of claim 17 wherein the computer-executable instructions further determine whether first terms of exchange of the first entity are satisfied and second terms of exchange of the second entity are satisfied and when the first terms of exchange and the second terms of exchange are satisfied, direct the exchange of the asset.

19. The one or more computing systems of claim 18 wherein the first reveal condition and the first terms of exchange are stored in a first database that includes an index and a table, the table including a record for each asset that is available to be exchanged and a quantity of the asset and a price, the index including an entry for each record that identifies the record, the asset of the record, and a reveal condition to be satisfied when the asset is to be exchanged.

20. The one or more computing systems of claim 15 wherein the computer-executable instructions further, before recording the transaction, direct notarization the transaction.

21. The one or more computing systems of claim 15 wherein the computer-executable instructions are stored in a secure enclave of the one or more computing systems.

22. The one or more computing systems of claim 15 wherein the computer-executable instructions that determine of whether a first reveal condition is satisfied control execution of computer code that implements the first reveal condition.

23. The one or more computing systems of claim 15 wherein the first reveal condition is encrypted with an encryption key and the first reveal condition is decrypted by a central processing unit executing instructions a secure enclave of the one or more computing systems.

24. The one or more computing systems of claim 15 wherein the first reveal condition is broadcast by a first node of a first entity to other nodes of a network of nodes.

25. A method performed by one or more computing systems of an offeree node for controlling privacy in an exchange of an asset with an offeror node, the method comprising:

generating for the offeree node an offeree attestation of code of a secure enclave for controlling privacy, the offeree attestation including a hash of the code and generated by a central processing unit of the offeree node;

providing the offeree attestation to the offeror node;

receiving an offeror attestation from the offeror node;

determining whether the offeror attestation represents trusted code of the offeror node; and receiving from the offeror node an encrypted offer query of an offeror that includes an offeror reveal condition, an asset identifier of the asset, and offeror terms of exchange;

decrypting the encrypted offer query using a public key of the offeror node;

accessing an encrypted offeree reveal condition and encrypted offeree terms of exchange for the asset;

decrypting the encrypted offeree reveal condition and encrypted offeree terms using a private key of the offeree node;

determining whether the offeror reveal condition and the offeree reveal condition are satisfied;

determining whether the offeror terms of exchange and the offeree terms of exchange are satisfied; and when the offeror reveal condition, the offeree reveal condition, the offeror terms of exchange, and the offeree terms of exchange are satisfied, directing the revealing of the offeror to the offeree;

directing the revealing of the offeree to the offeror; and recording a transaction in a secure space associated with a plurality of nodes.

* * * * *